United States Patent
Chen et al.

(10) Patent No.: US 7,688,481 B2
(45) Date of Patent: Mar. 30, 2010

(54) SCANNING APPARATUS WITH DIFFERENT RESOLUTIONS

(75) Inventors: Hsi-Yu Chen, Taipei (TW); Chien-Kuo Kuan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 356 days.

(21) Appl. No.: 11/949,558

(22) Filed: Dec. 3, 2007

(65) Prior Publication Data

US 2009/0040566 A1    Feb. 12, 2009

(30) Foreign Application Priority Data

Aug. 10, 2007    (TW) .............................. 96129539 A

(51) Int. Cl.
*H04N 1/04*    (2006.01)
(52) U.S. Cl. ...................... 358/486; 358/497; 358/488; 358/408; 358/474; 358/449
(58) Field of Classification Search ................. 358/497, 358/494, 474, 486, 488, 505, 401, 408, 449; 399/212, 211; 382/312, 318, 319; 250/234–236, 250/216
See application file for complete search history.

(56) References Cited

U.S. PATENT DOCUMENTS

| | | | | |
|---|---|---|---|---|
| 4,580,172 A | * | 4/1986 | Rajagopal | 358/451 |
| 5,734,477 A | * | 3/1998 | Tsai | 358/296 |
| 6,041,198 A | * | 3/2000 | Chen | 399/51 |
| 6,424,433 B1 | * | 7/2002 | Miyauchi et al. | 358/471 |
| 6,624,914 B1 | * | 9/2003 | Hendrix et al. | 358/484 |
| 6,985,267 B2 | * | 1/2006 | Tang et al. | 358/474 |

* cited by examiner

*Primary Examiner*—Cheukfan Lee
(74) *Attorney, Agent, or Firm*—Kirton & McConkie; Evan R. Witt

(57) ABSTRACT

The present invention relates to a scanning apparatus with different resolutions. The scanning apparatus includes a casing, a scanning module, a reflective module, a first lens, a second lens, a first sensing element, a second sensing element and a main reflective mirror. The first lens and the first sensing element have a first resolution and are used for scanning a first-sized document. The second lens and the second sensing element have a second resolution and are used for scanning a second-sized document. The main reflective mirror arranged between the first sensing element and the second sensing element for preventing interference of the first sensing element with the second sensing element.

4 Claims, 7 Drawing Sheets

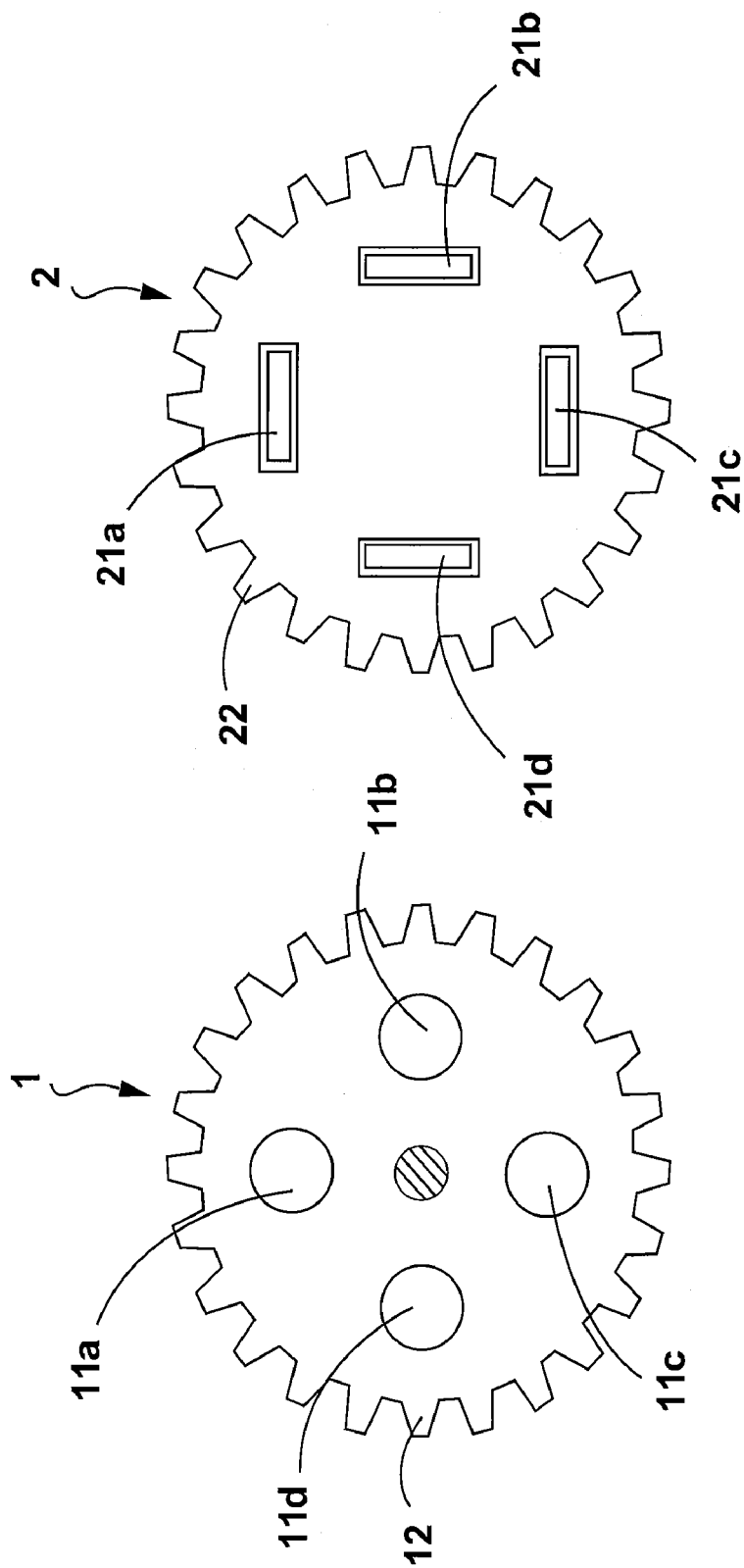

SCANNING APPARATUS WITH DIFFERENT RESOLUTIONS

FIELD OF THE INVENTION

The present invention relates to a scanning apparatus, and more particularly to a scanning apparatus having multiple sets of sensing elements and lens for providing different resolutions.

BACKGROUND OF THE INVENTION

Generally, a typical scanning apparatus has a single sensing element and a single lens for capturing an image of a document. The conditions of the sensing element and the single lens contained in the scanning apparatus are preset to achieve a suitable resolution. That is, the scanning performance is optimized when the document is scanned under the designed resolution. For scanning the document under a different resolution, another scanning apparatus having a desired resolution is necessary. That is, the conditions of the sensing element and the lens of a specified scanning apparatus which are suitable for scanning A4-sized documents are usually improper to scan A3-sized documents. Under this circumstance, another scanning apparatus with a different set of sensing element and lens and having a desired resolution for the A3-sized documents should be offered. For example, although the scanning apparatus which is suitable for scanning A3-sized documents can scan A4-sized documents, the scanned images are usually blurred and unacceptable because the resolution is insufficient. On the other hand, the scanning apparatus which is suitable for scanning A4-sized documents fails to be used for scanning A3-sized documents because the size of the A3-sized document is greater than the glass platform of the scanning apparatus. In addition, since the width of the A3-sized document is very large (e.g. 297 mm), the optical path length is increased and thus the resolution of the scanned images is reduced. Under this circumstance, the scanned images are also blurred. For solving the above problems, some commercial scanning apparatuses with different resolutions have been proposed.

For example, a scanning apparatus with diverse resolution is described in Taiwanese Patent No. 00488143. Referring to FIG. 1, a schematic partial view of such a scanning apparatus is illustrated. The scanning apparatus of FIG. 1 principally includes a first rotational disk 1, a second rotational disk 2, a spindle 3, a transmission shaft 4 and a motor 5. The first rotational disk 1 has a plurality of lenses 11a, 11b, 11c and 11d, which are located in the first rotational disk 1 and arranged in an annular manner. Please refer to FIG. 2 and FIG. 3. The second rotational disk 2 has a plurality of charge-coupled devices (CCDs) 21a, 21b, 21c and 21d, which are located in the second rotational disk 2 and arranged in an annular manner. These charge-coupled devices have different resolutions.

Please refer to FIG. 1 again. The spindle 3 penetrates through centers of the first rotational disk 1 and the second rotational disk 2 and is rotatable. The transmission shaft 4 penetrates through a first one-way shaft bearing 41a and a second one-way shaft bearing 41b such that the first one-way shaft bearing 41a and the second one-way shaft bearing 41b are rotatable. In addition, the first one-way shaft bearing 41a and the second one-way shaft bearing 41b are respectively engaged with the outer rims of the first gear teeth 12 of the first rotational disk 1 and the second gear teeth 22 of the second rotational disk 2. The transmission shaft 4 has one end attached to a shaft gear 42, which is engaged with a transmission gear 51 of a motor 5. By means of the above linking mechanism, the first rotational disk 1 and the second rotational disk 2 are rotated once the motor 5 is activated. The first rotational disk 1 and the second rotational disk 2 are rotated in opposite directions because the first one-way shaft bearing 41a and the second one-way shaft bearing 41b have opposite rotation directions. In other words, the transmission shaft 4 is rotated in only one direction, but the first one-way shaft bearing 41a and the second one-way shaft bearing 41b on the transmission shaft 4 in opposite directions.

FIG. 4 schematically shows the structure of the one-way shaft bearing of the conventional scanning apparatus. As shown in FIG. 4, the one-way shaft bearing includes an outer tube 81, a plurality of gear teeth 811, a plurality of rollers 82 and an inner tube 83. The rollers 82 are located between the outer tube 81 and the inner tube 83. A plurality of taper wedge members 812 are attached on the inner surface of the outer tube 81. Each roller 82 is located between two adjacent wedge members 812. When the gear teeth 811 on the outer peripheral of the outer tube 81 is driven to rotate in an anti-clockwise direction, the rollers 82 will roll along the surfaces of the wedge members 812 without hindrance an thus the inner tube 83 cannot be driven to rotate in an anti-clockwise direction. In other words, the anti-clockwise rotation of the outer tube 81 results in idle running of the inner tube 83. On the other hand, when the gear teeth 811 on the outer peripheral of the outer tube 81 is driven to rotate in a clockwise direction, the rollers 82 will be retained by the wider edges of the wedge members 812 an thus the inner tube 83 will be driven to rotate in a clockwise direction. In other words, the outer tube 81 and the inner tube 83 are simultaneously driven to rotate. As shown in FIG. 1, the one-way shaft bearing 41a and 41b mounted on the transmission shaft 4 have the same structures but are arranged in reverse directions. When the motor 5 rotates in a clockwise direction to drive rotation of the first rotational disk 1, the second rotational disk 2 will remain stationary. Likewise, when the motor 5 rotates in an anti-clockwise direction to drive rotation of the second rotational disk 2, the first rotational disk 1 will remain stationary. In other words, no matter what direction the motor 5 rotates, only one of the first rotational disk 1 and the second rotational disk 2 is driven to rotate.

Please refer to FIG. 1 again. By rotating the first rotational disk 1, one of the lenses 11a, 11b, 11c and 11d may be moved on the optical path of the scanning apparatus to pair with a selected CCD (such as 21a) for obtaining different combinations of resolution. Likewise, by rotating the second rotational disk 2, one of the CCDs 21a, 21b, 21c and 21d may be moved on the optical path of the scanning apparatus to pair with a selected lens (such as 11a) for obtaining different combinations of resolution. If necessary, the motor 5 is rotated in clockwise and anti-clockwise directions, one of the lenses 11a, 11b, 11c and 11d of the first rotational disk 1 is moved on the optical path of the scanning apparatus to pair with one of the CCDs 21a, 21b, 21c and 21d of the second rotational disk. Through this arrangement, a wide range of resolutions may be obtained.

Although the scanning apparatus with diverse resolution as described above may alleviate the drawback of using the single-resolution scanning apparatus, there are still some problems. For example, the rotational disks are engaged with the corresponding one-way shaft bearings through engagement of corresponding gear teeth and the rotational disks are controlled to rotate through the gear teeth. Due to unmatched engagement of gear teeth, erroneous operation of the adjusting the resolution readily occurs. Moreover, during the scanning operation, the selected lens and the selected CCD should be precisely aligned with each other by rotating the rotational disks. As known, it is time-consuming to precisely align the selected lens with the selected CCD. As the scanning apparatus has been used for a long term, the accuracy of precise alignment will be impaired because the gear teeth are readily abraded. Under this circumstance, it is difficult to align the selected lens with the selected CCD and move the selected lens with the selected CCD on the optical path.

Therefore, there is a need of providing an improved scanning apparatus with different resolutions.

SUMMARY OF THE INVENTION

It is an object of the present invention to provide a scanning apparatus with different resolutions for obviating the drawbacks encountered from the prior art.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 2 is a schematic view illustrating a first rotational disk of the conventional scanning apparatus;

FIG. 3 is a schematic view illustrating a second rotational disk of the conventional scanning apparatus;

DETAILED DESCRIPTION OF THE PREFERRED EMBODIMENT

Figure 1:
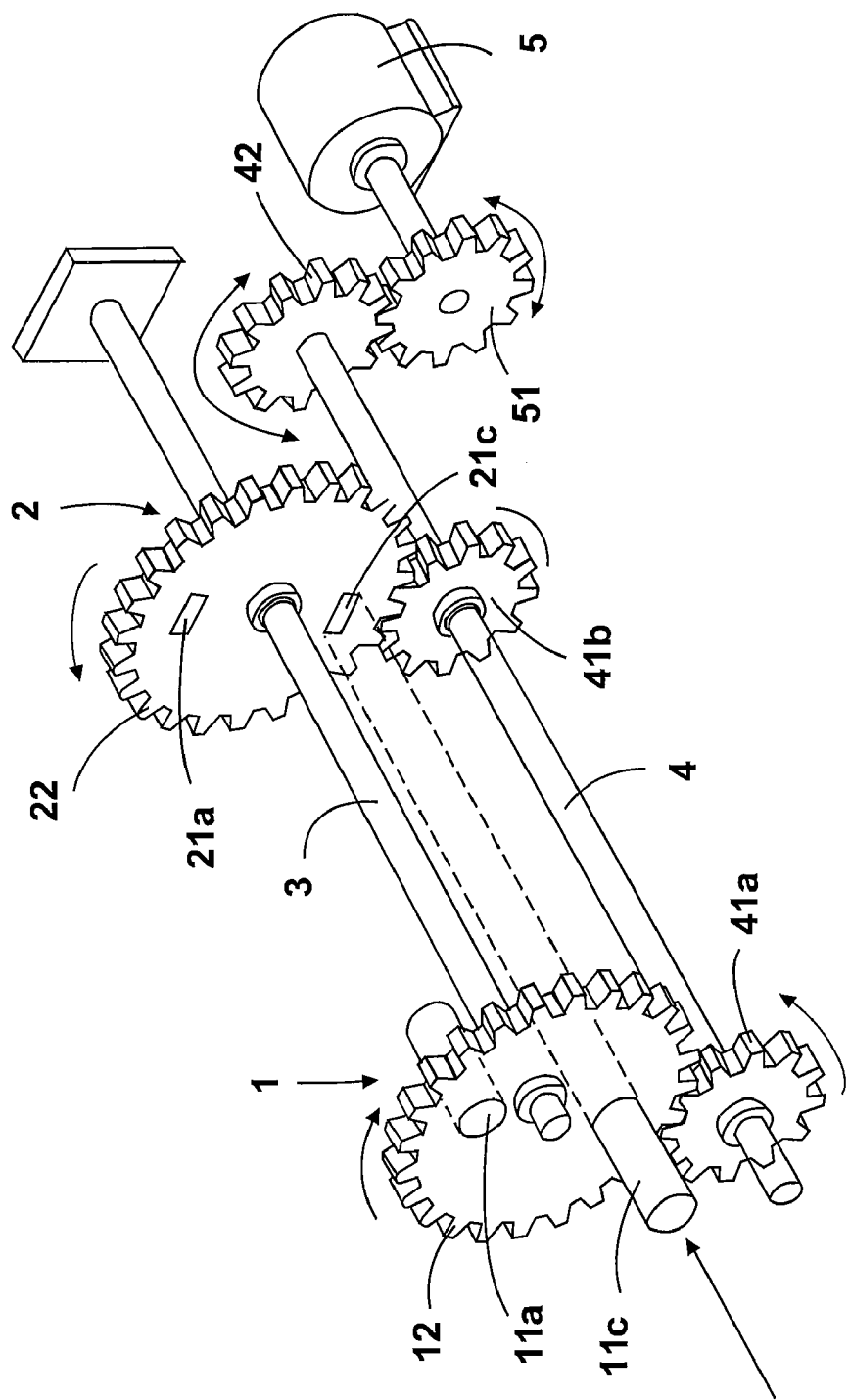
FIG. 1 is a schematic partial view of a conventional scanning apparatus.
Figure 4:
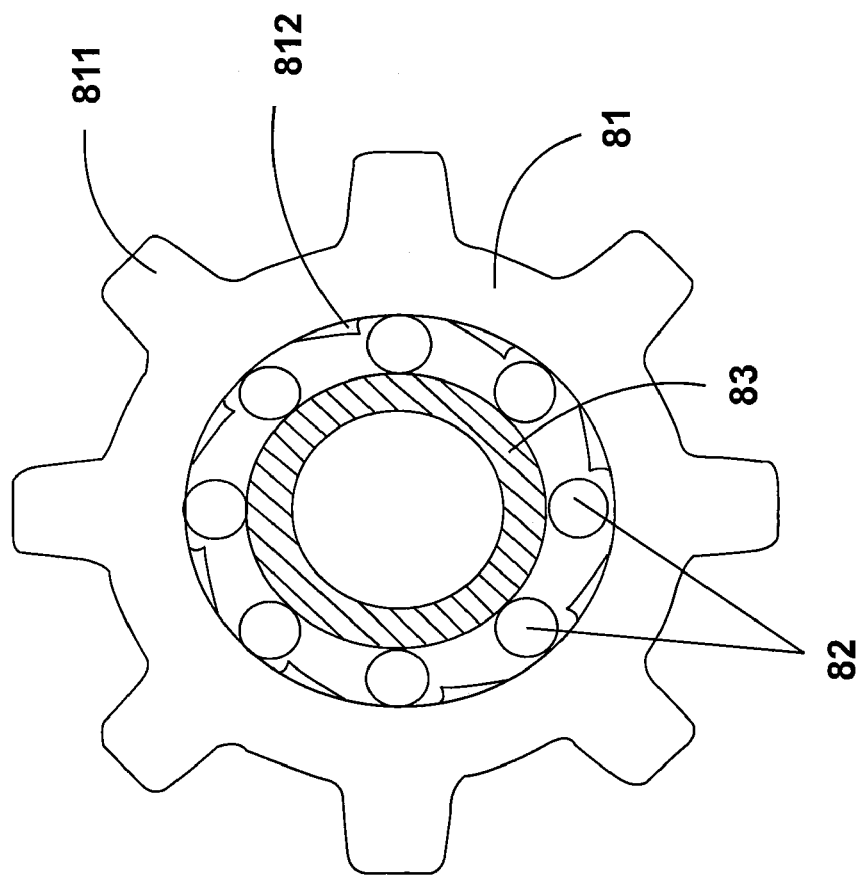
FIG. 4 is a schematic view illustrating a one-way bearing of the conventional scanning apparatus.
Figure 5:
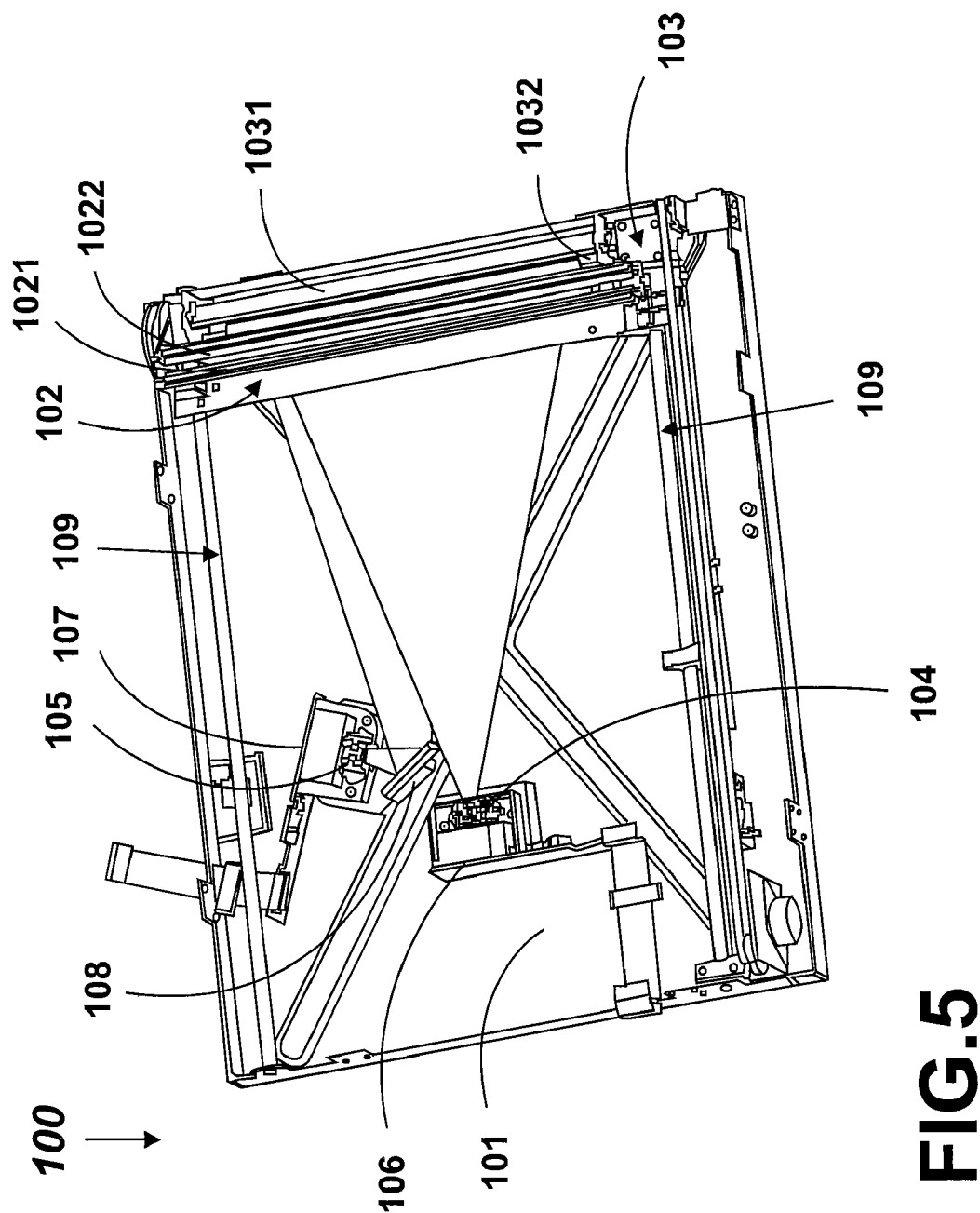
FIG. 5 is a schematic perspective view of a scanning apparatus with different resolutions according to a preferred embodiment of the present invention.

For obviating the drawbacks encountered from the prior art, the present invention provides a scanning apparatus with different resolutions. FIG. 5 is a schematic perspective view of a scanning apparatus with different resolutions according to a preferred embodiment of the present invention. The scanning apparatus 100 of the present invention principally includes a casing 101, a scanning module 102, a reflective module 103, a first lens 104, a second lens 105, a first sensing element 106, a second sensing element 107, a main reflective mirror 108 and a transmission mechanism 109. The first lens 104 and the second lens 105 have different focuses. Examples of the first sensing element 106 and the second sensing element 107 are charge coupled devices (CCDs).

As shown in FIG. 5, the scanning module 102 is disposed within the casing 101. The scanning module 102 includes a lamp tube 1021 and a first reflective mirror 1022. The light beam emitted from the lamp tube 1021 is reflected by the reflective mirror 1022 and then advances toward a second reflective mirror 1031. The reflective module 103 includes the second reflective mirror 1031 and a third reflective mirror 1032. The second reflective mirror 1031 and the third reflective mirror 1032 may reflect light beams to the sensing elements 106 and 107.

The first sensing element 106 is disposed on the bottom of the casing 101 and beside the first lens 104 such that the light beam penetrating through the first lens 104 may be received by the first sensing element 106. In addition, the first lens 104 and the first sensing element 106 are cooperated to result in a first resolution.

The second sensing element 107 is disposed on the bottom of the casing 101 and beside the second lens 105 such that the light beam penetrating through the second lens 105 may be received by the second sensing element 107. In addition, the second lens 105 and the second sensing element 107 are cooperated to result in a second resolution.

The main reflective mirror 108 is arranged between the first sensing element 106 and the second sensing element 107. The first sensing element 106 and the second sensing element 107 are separated by the main reflective mirror 108 so as to prevent interference of the first sensing element 106 with the second sensing element 107. Moreover, the transmission mechanism 109 is disposed inside the casing 101 and includes two transmission rods. The two transmission rods of the transmission mechanism 109 are connected to the scanning module 102 and the reflective module 103. Through the transmission mechanism 109, the scanning module 102 and the reflective module 103 are movable in the scanning apparatus 100.

Figure 6:
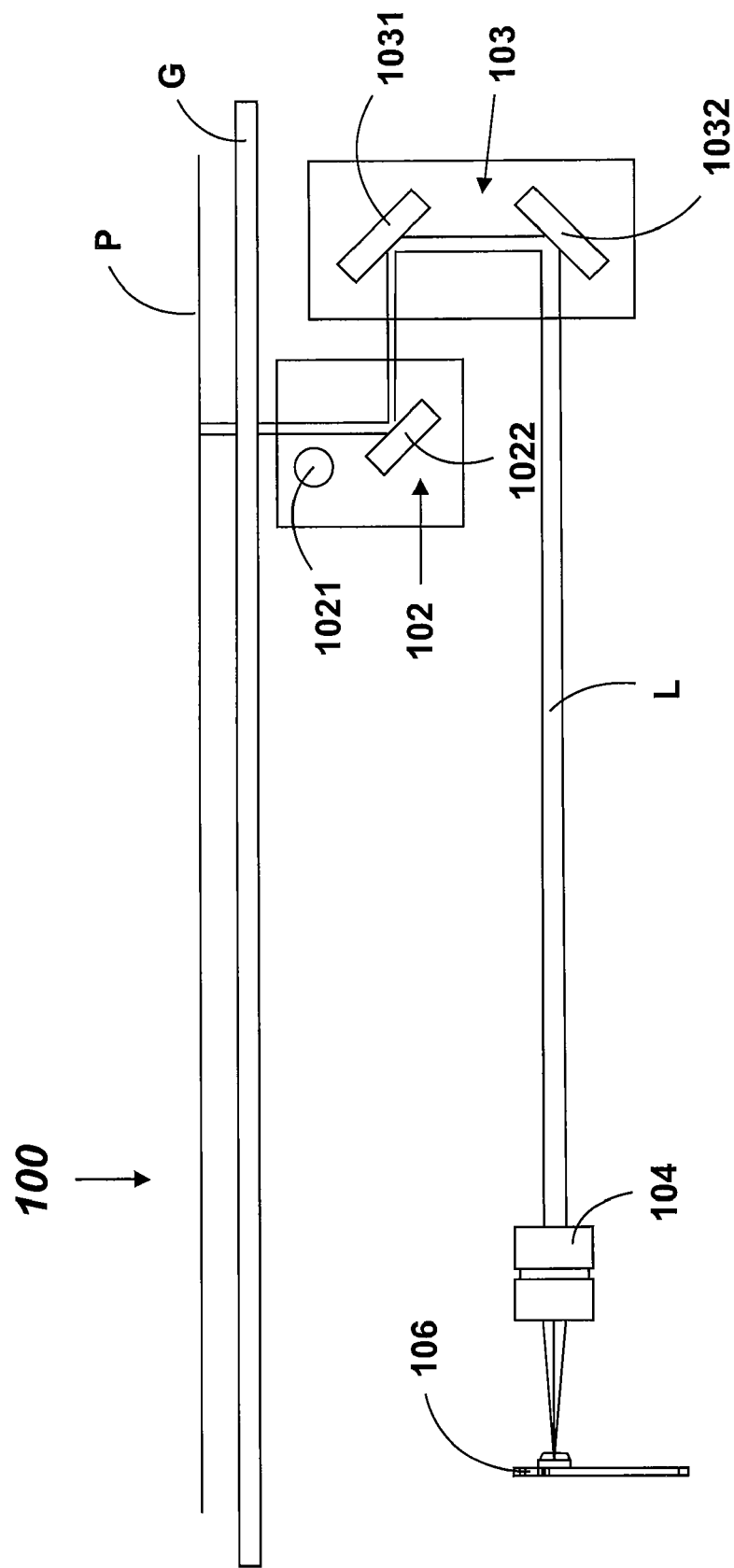
FIG. 6 is a schematic diagram illustrating the path of light beams in the scanning apparatus according to the present invention.

FIG. 6 is a schematic diagram illustrating the path of light beams in the scanning apparatus according to the present invention. In the drawings, only the reflective light beams are shown. Hereinafter, a scanning process is illustrated. First of all, a document P to be scanned is placed on a glass platform G. The light lamp 1021 of the scanning module 102 emits a light beam L. The light beam L penetrates through the glass platform G of the scanning apparatus 100 and is then projected on the document P. Generally, the texts or graphs contained in the document P may be classified into a relatively darker area and a relatively lighter area. The light beam L is absorbed by the relatively darker area but a major portion of the light beam L is reflected by the relatively lighter area. Depending on the colors, the intensities of the reflected light beam are different. As a consequence, the scanning apparatus 100 may perform color scanning operations by analyzing the intensities of the reflected light beam L. The reflected light beam L is then reflected by the first reflective mirror 1022 and enters the reflective module 103. The light beam L is successively reflected by the second reflective mirror 1031 and the third reflective mirror 1032 of the reflective module 103. After exited from the reflective module 103, the light beam L penetrates through the first lens 104 and is received by the first sensing element 106. Upon reception of the light beam L, the light beam L is converted by the first sensing element 106 into a current, i.e. an analog signal. The analog signal is then transmitted to an analogy/digital converter (not shown) to be converted into a digital signal, which can be analyzed by the computer. After a computing analysis is performed on the digital signal, an image file to be used by the general user is created.

Please refer to FIG. 5 again. For implementing a complete scanning operation, the light beam needs to be projected on the whole document. Through the transmission mechanism 109, the scanning module 102 and the reflective module 103 are movable in the scanning apparatus 100 such that the sensing elements may receive the light beam reflected from the whole document. In FIG. 5, the scanning module 102 and the reflective module 103 are disposed on one terminal of the scanning apparatus 100. Once the scanning operation is started, the scanning module 102 and the reflective module 103 are simultaneously driven by the transmission mechanism 109 to move forwardly. Generally, the moving speed of the scanning module 102 is two times that of the reflective module 103. Provided that the moving speed of the scanning module 102 is V1 and the moving speed of the reflective module 103 is Vr, a formula of V1=2Vr is obtained. Since the light beam emitted from the lamp tube 1021 of the scanning module 102 needs to be projected on the whole document, the moving speed of the scanning module 102 is relatively higher than the reflective module 103.

Figure 7:
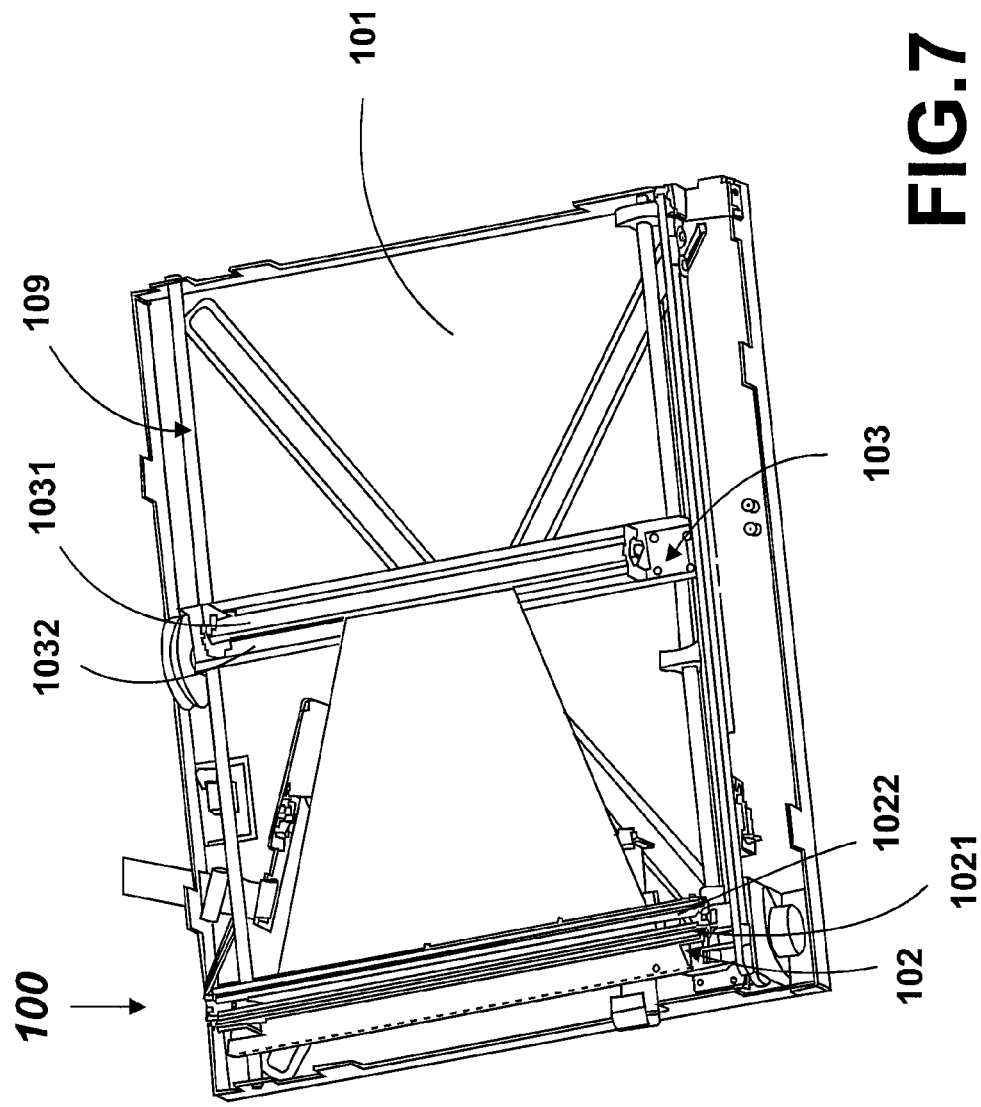
FIG. 7 is a schematic perspective view illustrating relative positions of the scanning module and the reflective module 1 in the moving state.

FIG. 7 is a schematic perspective view illustrating relative positions of the scanning module 102 and the reflective module 103 in the moving state. When the light beam emitted from the lamp tube 1021 of the scanning module 102 has been projected on the whole document, the scanning module 102 is moved to the other terminal of the scanning apparatus 100. Meanwhile, the reflective module 103 is approximately located in the middle of the scanning apparatus 100, as can be seen in FIG. 7.

Figure 8:
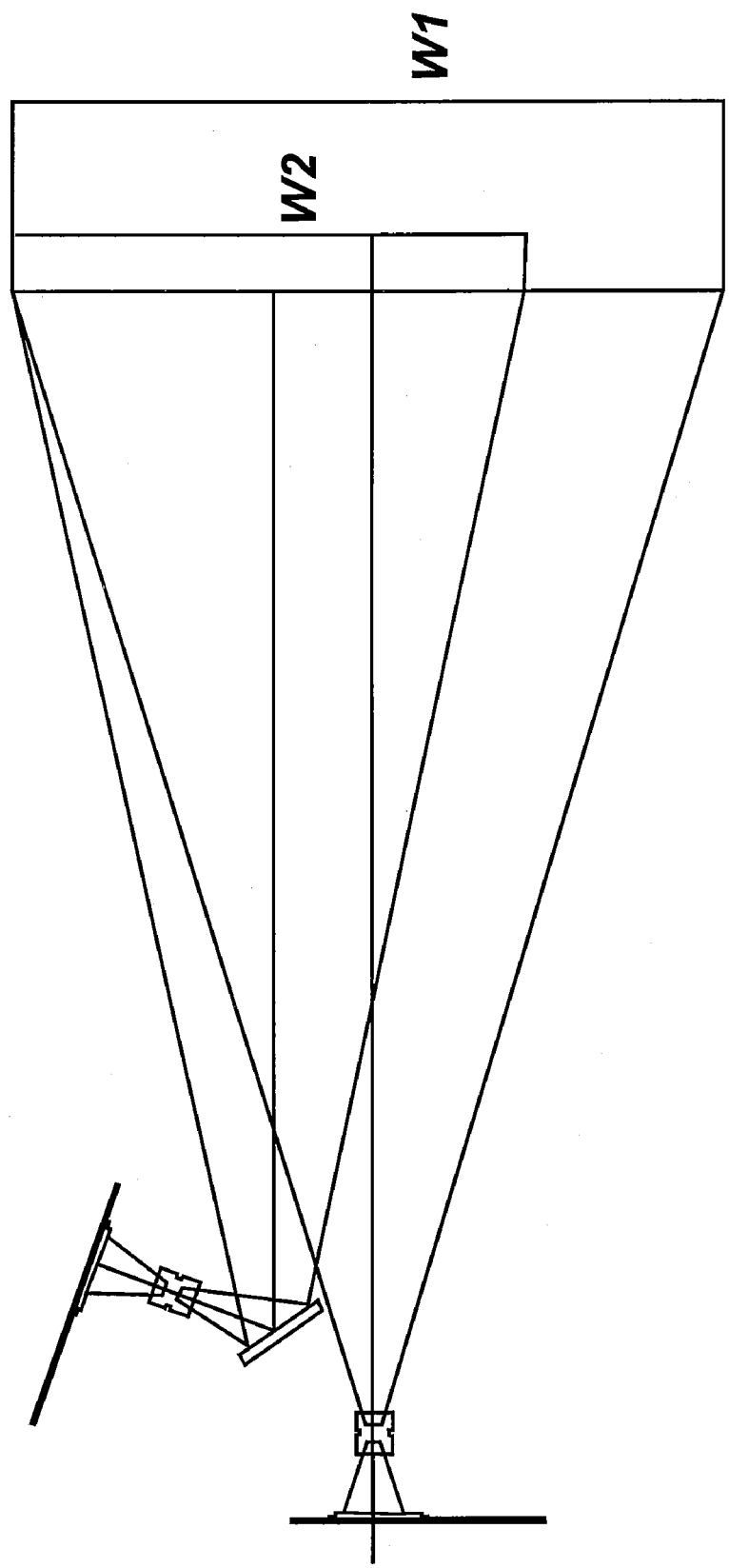
FIG. 8 is a schematic diagram illustrating the relative positions of the first sensing element and the second sensing element according to a preferred embodiment of the present invention.

FIG. 8 is a schematic diagram illustrating the relative positions of the first sensing element and the second sensing element according to a preferred embodiment of the present invention. The first sensing element and the second sensing element are used to receive the images of a first-sized document and a second-sized document, respectively. In an embodiment, the first-sized document is an A3-sized document and the second-sized document is an A4-sized document. The arrangements of the first sensing element and the second sensing element are determined on the basis of two criteria. Hereinafter, the term "optical path length" used herein indicates a distance of the light beam traveling from the document P to a selected sensing element. In other words, a first optical path length T1 indicates the distance of the light beam traveling from the document P to the first sensing element and a second optical path length T2 indicates the distance of the light beam traveling from the document P to the second sensing element. In accordance with the first criterion, the first optical path length T1 is equal to the second optical path length T2, i.e. T=T2. In accordance with the second criterion, the first scan width of the first sensing element for receiving the image of the A3-sized document needs to be equal to the width of the A3-sized document and the second scan width of the second sensing element for receiving the image of the A4-sized document needs to be equal to the width of the A4-sized document, as can be seen in FIG. 8.

The present invention is illustrated by referring to the A3-sized document and the A4-sized document. Nevertheless, the present invention can be applied to other documents of different sizes so long as they satisfy the above two criteria.

From the above description, the scanning apparatus of the present invention is advantageous over the conventional scanning apparatus. For example, since no engagement between the gear teeth is required, the problems of increasing inaccuracy and causing abraded gear teeth will be solved. Moreover, by increasing the number of lenses and sensing elements contained in the scanning apparatus, the scanning apparatus may provide more than two resolutions.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanning apparatus for scanning a first-sized document and a second-sized document, said scanning apparatus comprising:
   a casing;
   a scanning module disposed inside said casing and including a lamp tube emitting a light beam and a first reflective mirror;
   a reflective module disposed inside said casing and including a second reflective mirror and a third reflective mirror;
   a first lens and a second lens disposed on a bottom of said casing, wherein said first lens and said second lens have different focuses;
   a first sensing element disposed on said bottom of said casing for receiving said light beam penetrating through said first lens, thereby reading the image of said first-sized document;
   a second sensing element disposed on said bottom of said casing for receiving said light beam penetrating through said second lens, thereby reading the image of said second-sized document, wherein said first sensing element and said second sensing element have different resolutions; and
   a main reflective mirror arranged between said first sensing element and said second sensing element.

2. The scanning apparatus according to claim 1 further comprising a transmission mechanism for moving said scanning module and said reflective module within said scanning apparatus.

3. The scanning apparatus according to claim 1 wherein said first sensing element and said second sensing element are charge coupled devices (CCDs).

4. The scanning apparatus according to claim 1 wherein the moving speed of said scanning module is two times the moving speed of said reflective module.

* * * * *